United States Patent Office 2,936,302
Patented May 10, 1960

2,936,302

OLEFIN POLYMERIZATION WITH PRETREATED CATALYST

Robert H. Jones, East Brunswick, Roger M. Nagel, Pennington, and Calvin N. Wolf, Cranbury, N.J., assignors to Petro-Tex Chemical Corporation, Houston, Tex., a corporation of Delaware No Drawing. Application August 12, 1957
Serial No. 677,773

12 Claims. (Cl. 260—93.7)

This invention relates to improvements in the polymerization of olefins, and particularly to the polymerization of ethylene and α-olefins to form high molecular weight, high density, oriented polymers, by means of a novel and improved catalyst system.

It is well known that ethylene and other olefins can be polymerized to form relatively low molecular weight products through the use of certain organo-metallic catalysts. More recently it has been shown that, through the use of certain catalyst systems, particularly those derived from certain compounds of metals of groups IV to VI of the periodic table of elements in combination with other compounds of metals of groups I to III of the periodic table, high molecular weight polymers characterized by a linear structure and a regular orientation of the polymer chains are obtained.

When olefins containing three or more carbon atoms are thus polymerized, head-to-tail polymer chains may be formed wherein the asymmetric carbon atoms on the main polymer chains have identical steric configurations over long molecular lengths. These stereospecific polymers of α-olefins are generally referred to as "isotactic" polymers. They have been found to exhibit the regular X-ray diffraction patterns of crystals, as do the linear polyethylenes, and in fact to behave as if the polymer chains are regularly oriented as in a crystal. Their melting points, densities and tensile strengths are much higher than those of their amorphous analogs of similar molecular weight, and their properties differ markedly because of this regularity of configuration.

In general, the polymerization of ethylene and α-olefins does not produce exclusively a crystalline product, but the products are mixtures of polymers having different steric configurations and different molecular weights, including a substantial proportion of unoriented amorphous polymer. To realize full benefits of the desirable properties of the crystalline polymer, it is highly advantageous to prepare a polyolefin containing as large a proportion thereof as possible. It is also desirable to secure a high conversion of monomer to polymer, thereby increasing the overall yield of oriented product. Although it is theoretically possible to produce a polyolefin which is predominantly or exclusively linear and regularly oriented, this is extremely difficult to achieve in practice, and the methods suggested in the literature for so doing are inefficient and, at best, impractical.

Thus, an object of the present invention is to provide a convenient, commercially feasible method for the production of polyolefins which contain a high proportion of crystalline polymer.

Another object is to provide a novel and improved catalyst system for effecting the head-to-tail, stereospecific polymerization of α-olefins of three or more carbon atoms.

A further object is to provide an easily handled and controlled catalyst system for the polymerization of olefins.

A still further object is to provide a polyolefin having a substantially higher proportion of sterically oriented polymer than was heretofore available.

These and other objects, and attendant advantages, will become apparent from the following description of the invention.

The preferred catalyst system of this invention is derived from a combination of an alkyl aluminum halide and a tetraalkyl titanium ester. This catalyst system is effective in polymerizing ethylene or α-olefins in excellent yields, to form high molecular weight products rich in crystalline, oriented polymer.

We have discovered that the proportion of crystalline, oriented polymer produced through the use of said catalyst system can be substantially increased by a novel method of catalyst activation. This activation comprises the step of heating the catalyst system before polymerization, followed by a cooling step.

We have discovered further that the subsequent polymerization is accelerated if the catalyst activation is conducted in the presence of a small amount of an olefin, which olefin need not be the same as the monomer to be polymerized.

This process is applicable to the polymerization and copolymerization of olefins of the general formula $RCH=CH_2$, where R is preferably hydrogen or lower alkyl, but may also be higher alkyl, alkenyl, alicyclic or aryl. Examples of such olefins are ethylene, propylene, butene-1, isobutylene, butadiene, methyl butadiene, isoprene, 3-methylbutene-1, vinyl cyclohexane, 4-vinyl cyclohexene-1, octene-1, styrene and the like. Where R is hydrogen, the product is a polyethylene characterized by an unusually high degree of crystallinity. When R is an organic radical, the R groups constitute side chains on the polymer molecules, and the size of the R groups affects the tendency to crystallize and also the melting point, density and other properties of the oriented polymerizates. In general, when R is an organic radical the sterically oriented fraction must be separated from the unoriented fraction for maximum benefits.

The preferred catalyst system consists of an alkyl aluminum chloride in combination with an alkyl titanium ester. As the alkyl aluminum chloride, it is preferable that the alkyl group have the same number of carbon atoms as the monomer to be polymerized, and may be, for example, ethyl, n-propyl, isopropyl, butyl, cyclohexyl, and the like. The organic aluminum chloride may also be derived from other radicals, such as methyl, allyl or phenyl. Whether the monochloride, dichloride or sesquichloride, or a combination of these, is used depends on the particular system being polymerized. We have found that the ethyl aluminum chlorides, particularly diethyl aluminum chloride, may be conveniently used with most systems. The alkyl aluminum chlorides may be prepared following the method of Gross and Mavity, J. Org. Chem. 5, 110 (1940).

As the titanate ester, hydrocarbon tetraesters of titanium are preferred, particularly alkyltetraesters wherein the alkyl groups each contain about one to eighteen carbon atoms. These titanates may be prepared following the general method of Bischoff and Adkins, J. Am. Chem. Soc. 46, 256 (1924). It is generally preferable to use esters of alkyl groups having at least three carbon atoms, since they are more stable to hydrolysis and easier to handle than lower esters.

In carrying out the invention, the polymerization may be conducted in a batch, semi-continuous or continuous process. The catalyst complexes are readily prepared by adding each component separately to the reaction vessel. This is usually done in the presence of a solvent or diluent. The catalyst components may be added in pure form or each dissolved in a suitable solvent prior to addition to the reactor.

The catalyst system is activated by first heating to a temperature in the range of about 50–200° C., and preferably 75–160° C. Below about 75° C. there is a decrease in the proportion of crystalline or oriented polymer obtained in the subsequent polymerization, and below about 50° C. there is no significant activation effect at all. Heating to temperatures over about 160° C. reduces the yield of polymer, and temperatures over about 200° C. result in almost no polymerization. Optimum results are generally obtained in the range of about 90–120° C.

The system need not be maintained at this elevated temperature for a prolonged period. The improved results of this invention are apparent even when the system is cooled immediately upon reaching the desired activation temperature. This cooling stage, to a temperature below the range in which the previous heating step is operative, is an important aspect of the activation process. Further beneficial results may be obtained if this activated catalyst system is allowed to age. Normally, the period of cooling the preheated system is adequate, although a longer aging time may conveniently be used.

Where the catalyst activation is to be conducted in the presence of an olefin, a small amount of the total olefin is charged to the reactor prior to the initial heating step. The olefin in the activation need not be the same as the monomer to be polymerized, although it is preferably a lower unsaturated hydrocarbon. A mixture of olefins may also be used in the activation. The optimum amount added will vary with the type and total amount of catalyst present, the physical state of the catalyst, the monomer or monomers to be polymerized and the polymer properties desired. About 0.1–15% of the total charge, present during the catalyst activation, substantially accelerates the subsequent polymerization. When more than about 15% of olefin is present during the activation step, the proportion of sterically oriented polymer formed is reduced. When only very small amounts of olefin are present, results approach those obtained in the absence of olefin.

The olefin present during the catalyst activation and also the olefin to be polymerized, may be brought into contact with the reaction medium in a variety of ways. If the olefin is a gas it may for example, be passed across the surface of the reaction medium or bubbled through the medium. If the olefin is a liquid under the conditions of operating the process it may be dissolved in the medium. Other substances which are inert under the conditions of the polymerization reaction may be present, such as hydrogen or other hydrocarbons.

After the catalyst activation is completed, the monomer or mixture of monomers to be polymerized are charged to the reaction, and the polymerization conducted with agitation under the desired conditions of temperature and pressure. Water, oxygen and carbon dioxide should not be present in amounts sufficient to poison the catalyst. Air is suitably displaced from the apparatus by an inert atmosphere of, for example, nitrogen. The polymerization products obtained are treated with alcohol to decompose the organometallic compounds, and then may be washed further with acid to dissolve the metal compounds formed by the decomposition.

When a diluent is used for the reaction, this diluent should be inert to the reactants, and should preferably be liquid under the conditions at which the polymerization is carried out. Suitable diluents are paraffinic, alicyclic and aromatic hydrocarbons, or other solvents which do not react with the catalyst. They should be present in sufficient quantity that the reaction mixture may continue to be stirred throughout the course of reaction. The diluent used should be purified to remove any contaminants which may have an adverse effect on the reaction. If the diluent is contaminated with catalyst poisons, additional quantities of catalyst must be used.

The optimum polymerization temperature varies with the monomer, and with the molecular weight polymer desired. Polymerization proceeds at temperatures below room temperature, although the rate is increased at higher temperatures. For most systems, a convenient temperature range is about 25–150° C. At very high temperatures the catalysts decompose, although the reaction may be carried out at temperatures as high as 350°. The higher the temperature, the faster is the reaction rate. Higher molecular weight products are formed at lower temperatures. The characteristics of the polymer desired will affect the reaction conditions to some extent.

Pressures of about 1 to 60 atmospheres are conveniently employed, although the reaction can be carried out at pressures of 100 atmospheres or higher, and also at subatmospheric pressures if desired. The particular combination of temperature and pressure selected depends largely on whether it is desired to operate the process with the olefin in the gaseous or liquid phase. If the olefin is to be in the liquid phase the temperature selected must be below the critical temperature and sufficient pressure applied to maintain the olefin in a liquid state.

The quantities of catalysts used in relation to the total amount of olefin charged may vary within wide limits. When using a solution of purified reactants which contain no catalyst poisons, about 0.01% or less of catalyst is sufficient to effect the reaction, with about 0.1–2.0% catalyst a preferred quantity. When catalyst poisons are present larger amounts of catalyst must of course be used. It is desirable to avoid using unnecessarily large amounts of catalyst to avoid complicating the working-up process.

The conversion of monomer to isotactic polymer is also influenced by the proportion of alkyl aluminum chloride and alkyl titanate in the catalyst. The optimum proportion varies with the specific alkyl aluminum chloride and alkyl titanate used, and with the particular properties desired in the polymer. In general, about a 3–25 molar excess of alkyl aluminum chloride is desirable for high conversions of α-olefins.

When it is desired to separate the isotactic from the amorphous polymer formed, this may readily be done by their different solubility behavior in organic solvents. The products of this invention are useful to form films, fibers, sheets, tubes, bolded products and the like of enhanced properties and expanded utility. They may also be subjected to chemical modifying treatments such as halogenation, halogenation followed by dehalogenation, sulfonation and other reactions of hydrocarbons, and may also be irradiated by high energy particles to effect crosslinking or other structural modifications.

The invention is illustrated further by the following examples, wherein al parts are by weight. There are of course many forms of the invention in addition to these specific embodiments.

*Example 1*

An autoclave equipped with an agitator, heating jacket and thermocouple well was charged under nitrogen with 11.7 parts diethyl aluminum chloride, 6.1 parts tetra-2-ethylhexyl titanate, 116 parts cyclohexane and 19 parts butene-1. The reaction mixture was heated to 135° C. with agitation, and immediately cooled to room temperature. The system was aged for 19 hours at 19–25° C., after which 426 parts butene-1 was introduced, to a total pressure of 260 p.s.i.g. Polymerization was conducted for 4.5 hours at 95–115° C., during which time the pressure dropped to 80 p.s.i.g. The mixture was then cooled, and the polymer was washed with methanol, dissolved in hot toluene and washed with dilute hydrochloric acid and water. The polymer was then precipitated with methanol, filtered and dried under vacuum at 60–70° C. A yield of 415 parts (93.3%) was obtained. Extraction for 16 hours with boiling diethyl ether left an ether-insoluble residue of 71.4% of the polymer, characterized by a melt index of 0.63. The melt index is measured following ASTM method D–1238–52T, Procedure A modified, and is related to the molecular weight of the sample, a low melt index indicating a high molecular weight.

The above experiment was repated, omitting the catalyst activation steps. A yield of 81% polybutylene-1 was obtained, which on extraction with boiling diethyl ether left a residue of 31% of the polymer, having a melt index of 6.87. Not only is the fraction of isotactic polymer lower, but the molecular weight is also lower, in the absence of catalyst activation.

*Example 2*

Into an autoclave were charged 11.7 parts diethyl aluminum chloride, 6.1 parts tetra-2-ethylhexyl titanate, 4 parts propylene and 116 parts cyclohexane, as in Example 1. The mixture was heated to 135° C. with agitation, cooled to room temperature, and aged at 20–25° C. for 17 hours. Two hundred and seventy-eight parts propylene was introduced, and polymerization was conducted for 4.5 hours at 135–139° C. The mixture was then cooled, and the polymer was washed and precipitated as in Example 1. A total of 239 parts of polypropylene was obtained (86% yield), which on extraction for 16 hours with boiling heptane left an insoluble residue of 85% of the total polymer, having a melt index of 0.58.

Under the same polymerization conditions as above, but omitting the steps of heating, cooling and aging the catalyst, propylene was polymerized in 88% yield. The percentage of heptane-insoluble polymer was 50%, having a melt index of 35.5.

*Example 3*

An autoclave was charged with 7.82 parts diethyl aluminum chloride, 6.1 parts tetra-2-ethylhexyl titanate, 116 parts cyclohexane and 8 parts propylene, following the general procedure of Example 1. The mixture was heated to 135° C. with agitation, cooled at once to 20–25° C., and aged for 17 hours. Two hundred sixty parts propylene was then charged, and polymerization conducted at 50–60° C. for 4.5 hours. A yield of 90% polypropylene was obtained, of which 67% was insoluble after extraction for 8 hours with boiling heptane.

*Example 4*

An autoclave was charged with 3.92 parts of diethyl aluminum chloride and 2.03 parts of tetra-2-ethylhexyl titanate (a molar ratio of 9 to 1), 39 parts cyclohexane and 5 parts butene-1. The reaction mixture was stirred and heated to 135° C., immediately cooled to room temperature, and aged for 87 hours. Eighty-three parts of butene-1 was charged, and polymerization was conducted at 94–100° C. for 4.5 hours. The product was worked up as in Example 1, to produce a 91% yield of polymer, of which 56% was insoluble after extraction for 8 hours with boiling diethyl ether. This ether-insoluble fraction had a melt index of 0.44.

Repeating the above experiment, but omitting the catalyst activation steps of heating, cooling and aging, produced an 81% yield of polymer which contained 31% of an ether-insoluble fraction having a melt index of 6.87.

*Example 5*

This experiment illustrates the effect of omitting the cooling step in the catalyst activation. Following the general procedure of Example 1, an autoclave was charged with 3.92 parts of diethyl aluminum chloride, 2.03 parts tetra-2-ethylhexyl titanate, 39 parts cyclohexane and 5 parts of butene-1. The mixture was agitated and heated to 60–70° C., and maintained at that temperature for one hour. An additional 65 parts butene-1 was charged at 61° C., and polymerization was conducted at 135–145° C. for 4.5 hours. Working up the product as in Example 1 produced a 77% yield of polymer, of which 37.6% was insoluble in boiling diethyl ether. These results are typical of those obtained in the absence of the catalyst activation steps.

*Example 6*

Following the procedure of Example 1, an autoclave was charged with 1.95 parts diethyl aluminum chloride, 0.65 part tetrabutyl titanate, 39 parts cyclohexane and 4 parts butene-1. The mixture was agitated and heated to 160° C., cooled to room temperature and aged for 16 hours. 80 parts butene-1 was added, and polymerization conducted at 94–100° C. for 4.5 hours. Working up the product as in Example 1 produced an 83% yield of polymer, of which 50% was insoluble after extraction with boiling diethyl ether. The ether-insoluble fraction had a melt index of 0.32.

Repeating the above experiment, omitting the catalyst activation steps, produced an 81% yield of polymer of which 35% was insoluble in ether, this insoluble fraction having a melt index of 13.0.

*Example 7*

Following the procedure of Example 1, an autoclave was charged with 7.8 parts diethyl aluminum chloride and 6.1 parts tetra-2-ethylhexyl titanate (a catalyst molar ratio of 6 to 1), 117 parts cyclohexane and 15 parts butene-1. The mixture was agitated and heated to 135° C., cooled to 17–25° C. and aged for 16 hours. Charging an additional 381 parts butene-1, and polymerizing at 91–105° C. for 4.5 hours produced a 91% yield of polymer containing 59% ether-insoluble fraction having a melt index of 0.033.

Repeating the above experiment, omitting the catalyst activation steps, reduced the yield to 52%, containing 34% of an ether-insoluble residue having a melt index of over 20. These data indicate that, at a catalyst molar ratio of 6 moles diethyl aluminum chloride per mole titanate ester, catalyst activation has a marked effect on yield, the ether-insoluble fraction and the molecular weight.

*Example 8*

The procedure of Example 6 was repeated, at a catalyst molar ratio of 12 moles diethyl aluminum chloride per mole titanate. An autoclave was charged with 15.6 parts diethyl aluminum chloride, 6.1 parts tetra-2-ethylhexyl titanate, 117 parts cyclohexane and 14 parts butene-1. Activation was conducted by heating to 131° C., followed by cooling to 22–25° C. and aging for 17 hours. Charging an additional 382 parts butene-1, and polymerizing at 95–100° C. for 4.5 hours resulted in a 71% yield of polymer, of which 58% was insoluble in boiling diethyl ether. The ether-insoluble fraction had a melt index of 1.03.

Repeating the above experiment, omitting the catalyst activation steps, produced a 78% yield of polymer, of which 32% was insoluble in ether, this fraction having a melt index of 10.2. At a catalyst molar ratio of 12 to 1, catalyst activation has no significant effect on the yield, but a significantly greater proportion of ether-insoluble polymer is formed, characterized by a much higher molecular weight as shown by the melt index.

*Example 9*

Following the general procedure of Example 1, an autoclave was charged with 3.92 parts diethyl aluminum chloride, 2.03 parts tetra-2-ethylhexyl titanate, 39 parts cyclohexane and 7 parts butene-1 (8% of the total charge). The mixture was agitated and heated to 135° C., cooled to room temperature and aged for 30 minutes. Eighty parts butene-1 was charged, and polymerization was conducted at 95–100° C. for 4.5 hours. An 87% yield of polymer was obtained, of which 50% was insoluble in boiling diethyl ether and had a melt index of 0.64.

Repeating the above experiment, omitting the catalyst activation steps, produced a typical 81% yield of polymer of which 31% was ether-insoluble and had a melt index of 6.87.

Example 10

An autoclave was charged with 11.7 parts diethyl aluminum chloride, 6.1 parts tetra-2-ethylhexyl titanate, 351 parts cyclohexane and 65 parts butene-1 (15.7% of the total charge). The system was heated to 135° C., cooled to room temperature and aged for 17 hours. Charging an additional 350 parts butene-1 and polymerizing at 95–100° C. for 4.5 hours produced a 97% yield of polymer, of which 47% was insoluble in ether. This ether-insoluble fraction had a melt index of 0.14. This experiment shows that increasing the amount of butene-1 in the activation step (to 15.7% of the total charge), decreases slightly the percent ether-insoluble fraction, although excellent overall yields are obtained.

Example 11

An autoclave was charged with 11.6 parts diethly aluminum chloride, 6.1 parts tetra-2-ethylhexyl titanate and 116 parts cyclohexane. The mixture was agitated and heated to 135° C., followed by immediate cooling to room temperature and aging for 17 hours. A charge of 408 parts butene-1 was added, and polymerized at 96–98° C. for 4.5 hours. A 45% yield of polymer was obtained, of which 82% was insoluble after extraction for 16 hours with reflecting diethyl ether.

This experiment shows that catalyst activation in the absence of monomer produces a polymer containing a very large proportion of isotactic component, although in poorer overall yields under the same experimental conditions. Repeating the above experiment, but having 4.5% of the total butene-1 charged present in the catalyst activation step, increased the overall yield to 80%, but decreased the percent ether-insolubles to 59%.

Example 12

Following the procedure of Example 1, 11.7 parts diethyl aluminum chloride, 6.1 parts tetra-2-ethylhexyl titanate, 116 parts cyclohexane, and 22 parts butene-1 were charged into an autoclave. The mixture was agitated and heated to 135° C., cooled to 20–25° C. and aged for 16 hours. Charging an additional 406 parts butene-1, and polymerizing at 50–60° C. for 1.0 hour produced an 83% yield of polybutene containing 59% ether-insoluble fraction.

Repeating the above experiment, omitting the catalyst activation steps, reduced the yield to 21%, containing 56% of an ether-insoluble residue. These data suggest a rate increase due to the activated system.

Example 13

Following the general procedure of Example 1, an autoclave was charged with 11.7 parts diethyl aluminum chloride, 6.1 parts tetra-2-ethylhexyl titanate, 116 parts cyclohexane and 5 parts propylene. The mixture was agitated and heated to 135° C., followed by immediate cooling to room temperature and aging for 18 hours at 22–25° C. 347 parts butene was then charged, and polymerization conducted at 135–40° C. for 4.5 hours. A yield of 92% polymer was obtained, of which 55% was insoluble after extraction for 16 hours with boiling diethyl ether.

Repeating the above experiment, omitting the catalyst activation steps in the presence of propylene, produced an 87% yield of polybutene, of which 32% was insoluble in ether.

Example 14

Following the general procedure of Example 1, an autoclave was charged with 11.7 parts diethyl aluminum chloride, 6.1 parts tetra-2-ethylhexyl titanate, 116 parts cyclohexane, and 6 parts butene-1. The mixture was agitated and heated to 135° C., followed by immediate cooling to room temperature and aging for 17 hours at 22–25° C. Two hundred and sixty parts propylene was then charged and polymerization conducted at 135–40° C. for 4.5 hours. A yield of 89% polymer was obtained, of which 49% was insoluble after extraction for 16 hours with boiling n-heptane.

Repeating the above experiment, omitting the catalyst activation steps in the presence of butene, produced an 88% yield of polypropylene, of which 50% was insoluble after extraction in boiling heptane.

Example 15

Following the procedure of Example 1, an autoclave was charged with 5.86 parts diethyl aluminum chloride, 6.1 parts tetrastearyl titanate, 116 parts cyclohexane and 35 parts butene-1. The mixture was agitated and heated to 135° C., cooled to room temperature and aged for 16 hours. Three hundred and seventy-four parts butene-1 was charged, and polymerization conducted at 95–100° C. for 4.5 hours. A yield of 383 parts (94%) polymer was obtained, of which 54% was insoluble after extraction in boiling diethyl ether.

Example 16

Following the procedure of Example 1, an autoclave was charged with 3.9 parts diethyl aluminum chloride, 2.03 parts tetra-2-ethylhexyl titanate, 39 parts cyclohexane and 5 parts butene-1. The mixture was agitated and heated to 135° C., cooled to room temperature and aged for 16 hours. Eighty-four parts butadiene was then charged, and polymerization conducted at 135–40° C. for 4.5 hours. A 44% yield of a solid polymer was obtained, characterized by an iodine number of 361, and a 20% yield of a liquid polymer was recovered having an iodine number of 349.

Repeating the above experiment, omitting the butene and the catalyst activation steps, produced a 46% yield of a viscous liquid.

Example 17

Following the general procedure of Example 1, an autoclave was charged with 7.82 parts diethyl aluminum chloride, 6.1 parts tetra-2-ethylhexyl titanate, 116 parts cyclohexane and 34 parts ethylene. The mixture was agitated and heated to 136° C., cooled to room temperature and aged for 16 hours. Three hundred and sixty-seven parts butene-1 was charged, and polymerization was conducted at 135–140° C. for 4.5 hours. A 72.5% yield of polymer (290 parts) was obtained, of which 55% was insoluble after extraction with boiling diethyl ether.

Example 18

Following the general procedure of Example 1, an autoclave was charged with 3.9 parts diethyl aluminum chloride, 2.03 parts tetra-2-ethylhexyl titanate, 39 parts cyclohexane, and 4 parts butene-1. The mixture was agitated and heated to 135° C., followed by immediate cooling to room temperature and aging for 16 hours. Four parts butadiene and 87 parts butene-1 were then charged, and polymerization conducted at 94–99° C. for 4.5 hours. An 87% yield of a solid polymer having an iodine number of 4.2 was obtained.

Repeating the above experiment, omitting the catalyst activation steps in the presence of butene, produced less than 1% yield of polymer.

The ether insoluble fractions of the polybutenes prepared as described in the preceding examples demonstrate physical characteristics which are well suited to a number of different uses and commercial applications. They possess tensile strengths in the range of 1950–3600 p.s.i., the large majority being in the range of 2500–3000 p.s.i. with elongations in the range of 250–400%. The initial modulus generally falls in the range of 20,000–30,000 p.s.i. and occasionally as high as 65,000, depending, of course, on the particular conditions under which the polymer is formed. The densities normally fall in the range between 0.89 and 0.91.

Films produced from these polymers are pliable, tough and transparent. Molded samples exhibit superior stress cracking characteristics. Practical melting points or yield temperatures are in the range of 232–251° F., thus permitting molded specimens to be subjected to boiling water, for example, for use in sterilization of molded containers. The flexural modulus of the polybutenes is about equivalent to that of polyethylene at room temperature, and the butene polymer is considerably more pliable at temperatures as low as −40° C.

The physical characteristics of the propylene polymers are generally similar to those of the butene polymers except for higher melting points, higher initial modulus and lower elongation.

Pursuant to the requirements of the patent statutes, the principal of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

That which is claimed as patentably novel is:

1. A process for producing polyolefins which contain a high proportion of crystalline polymer comprising the steps of (1) first heating to about 75° to 160° C. a mixture comprising an alkyl aluminum chloride wherein said alkyl groups contain about 2 to 8 carbon atoms, a tetraalkyl titanium ester wherein said alkyl groups contain 3 to 18 carbon atoms, in a molar ratio of 3 to 25 mols of alkyl aluminum chloride compound per mol of tetraalkyl titanium ester, and a small amount of an alpha olefin containing 2 to 8 carbon atoms, (2) cooling said mixture to below about 75° C. and thereafter (3) contacting said mixture with an alpha-olefin containing 2 to 8 carbon atoms and polymerizing said alpha-olefin in the presence of said mixture, the amount of alpha-olefin being charged in (1) being from about 0.1 to about 15 percent of the total alpha-olefin in (3).

2. An improved process for producing polyolefins containing a high proportion of crystalline oriented polymer comprising the steps of (1) first heating to about 90° C. to 120° C. a mixture comprising an alkyl aluminum chloride wherein said alkyl groups contain 2 to 4 carbon atoms and a tetraalkyl titanium ester wherein said alkyl groups contain 3 to 18 carbon atoms in a molar ratio of 3 to 25 mols of alkyl aluminum chloride per mol of tetraalkyl titanium ester and a minor amount of an alpha-olefin containing 2 to 4 carbon atoms, (2) cooling said mixture to below about 75° C. and aging said mixture for at least one-half hour and thereafter (3) polymerizing an alpha-olefin containing 2 to 8 carbon atoms in the presence of said mixture, said minor amount of alpha-olefin charged in (1) being from about 0.1 to about 15 percent of the total alpha-olefin in (3) and said alkyl aluminum chloride and tetraalkyl titanium ester being present in amount from about 0.01 percent to about 2 percent based on the total charge weight.

3. The process of claim 2 wherein the alkyl aluminum chloride is diethyl aluminum chloride, and the alpha-olefin contains 3 to 4 carbon atoms.

4. The process of claim 3 wherein the alpha-olefin is butene-1.

5. The process of claim 3 wherein the tetraalkyl titanium ester is tetra-2-ethylhexyl titanate.

6. The process of claim 5 wherein the alpha-olefin is butene-1.

7. An improved catalyst for the polymerization of alpha-olefin containing 2 to 8 carbon atoms comprising the product formed by first heating to about 75° to 160° C. a mixture comprising an alkyl aluminum chloride wherein said alkyl groups contain 2 to 8 carbon atoms, a tetraalkyl titanium ester wherein said alkyl groups contain 3 to 18 carbon atoms, in a molar ratio of about 3 to 25 mols of alkyl aluminum chloride per mol of tetraalkyl titanium ester, and an alpha-olefin containing 2 to 8 carbon atoms in amount essentially equivalent to about 1/10 to about 15 percent of the total amount of alpha-olefin to be polymerized by said catalyst, and cooling said mixture to below about 75° C. prior to use as a catalyst for polymerization of alpha-olefins.

8. An improved catalyst for the polymerization of alpha-olefins containing 2 to 4 carbon atoms comprising the product formed by first heating to about 90° C. to 120° C. a mixture comprising an alkyl aluminum chloride wherein said alkyl groups contain 2 to 4 carbon atoms, a tetraalkyl titanium ester wherein said alkyl groups contain 3 to 18 carbon atoms in a molar ratio of about 3 to 25 mols of alkyl aluminum chloride per mol of titanium ester, and an alpha-olefin containing 2 to 4 carbon atoms in amount essentially equivalent to about 1/10 to about 15 percent of the total amount of alpha-olefin to be polymerized by said catalyst when said catalyst is present in amount from about 0.01 to about 2 percent of the total alpha-olefin polymerized, cooling said mixture to below about 75° C. and aging said mixture for at least about one-half hour prior to use as a catalyst for polymerization of alpha-olefins.

9. The catalyst of claim 8 wherein the alkyl aluminum chloride is diethyl aluminum chloride, and the alpha-olefin contains 3 to 4 carbon atoms.

10. The catalyst of claim 9 wherein the tetraalkyl titanium ester is tetra-2-ethylhexyl titanate.

11. The process for preparing an improved catalyst for the polymerization of alpha-olefins containing 2 to 8 carbon atoms comprising first heating to about 75 to 160° C. a mixture comprising an alkyl aluminum chloride wherein said alkyl groups contain 2 to 8 carbon atoms, a tetraalkyl titanium ester wherein said alkyl groups contain 3 to 18 carbon atoms in a molar ratio of about 3 to 25 mols of alkyl aluminum chloride per mol of tetraalkyl titanium ester and a lower alpha-olefin containing 2 to 8 carbon atoms in amount essentially equivalent to about 0.1 to 15 percent by weight of the total amount of alpha-olefin to be polymerized, and thereafter cooling said mixture to below 75° C.

12. The process for preparing an improved catalyst for the polymerization of alpha-olefins containing 2 to 4 carbon atoms comprising the steps of first heating to about 90° C. to 120° C. a mixture comprising diethyl aluminum chloride, a tetraalkyl titanium ester wherein said alkyl groups contain 3 to 18 carbon atoms in a mol ratio of about 3 to 25 mols of alkyl aluminum chloride per mol of tetraalkyl titanium ester and an alpha-olefin containing 2 to 4 carbon atoms in amount equivalent to about 0.1 to 15 percent by weight of the total alpha-olefin to be polymerized, cooling said mixture to below about 75° C. and aging said mixture for at least about one-half hour before use as a polymerization catalyst for alpha-olefins.

References Cited in the file of this patent

UNITED STATES PATENTS

| 2,824,090 | Edwards et al. | Feb. 18, 1958 |
| 2,827,446 | Breslow | Mar. 18, 1958 |
| 2,833,755 | Coover | May 6, 1958 |
| 2,862,917 | Anderson et al. | Dec. 2, 1958 |

FOREIGN PATENTS

| 534,888 | Belgium | Jan. 31, 1955 |
| 538,782 | Belgium | Dec. 6, 1955 |